No. 835,923. PATENTED NOV. 13, 1906.
G. W. VANDERSLICE.
VALVE FOR REGENERATIVE FURNACES.
APPLICATION FILED NOV. 12, 1902.
2 SHEETS—SHEET 1.
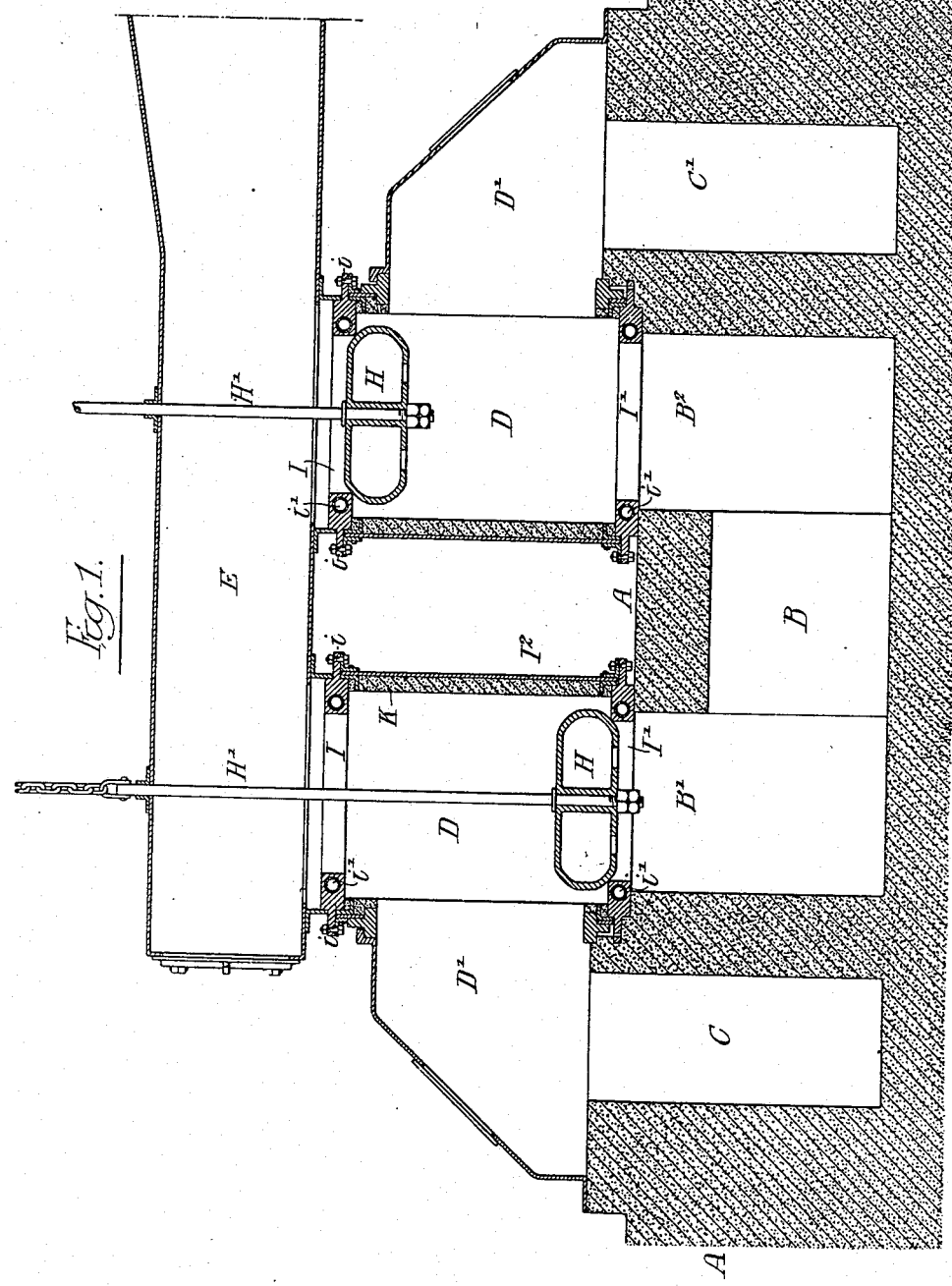

No. 835,923. PATENTED NOV. 13, 1906.
G. W. VANDERSLICE.
VALVE FOR REGENERATIVE FURNACES.
APPLICATION FILED NOV. 12, 1902.
2 SHEETS—SHEET 2.
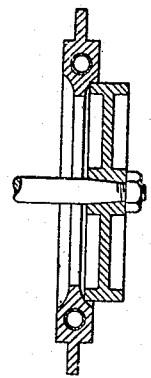
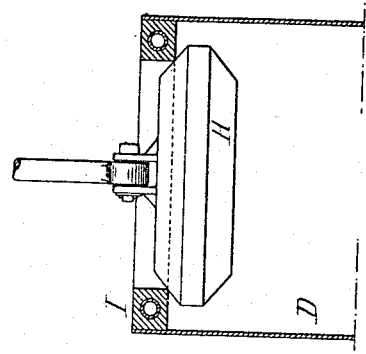
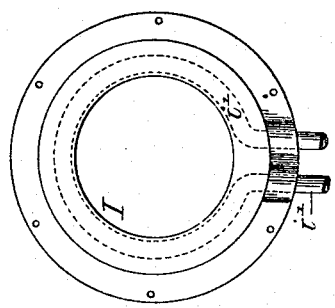
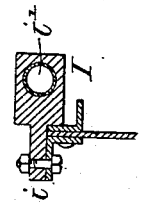
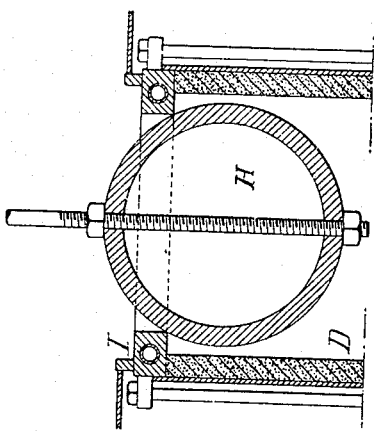
Witnesses:—
Frank L. A. Graham.
Herman E. Metius.
Inventor:—
George W. Vanderslice,
by his Attorneys;
Howson & Howson.

UNITED STATES PATENT OFFICE.

GEORGE W. VANDERSLICE, OF COATESVILLE, PENNSYLVANIA.

VALVE FOR REGENERATIVE FURNACES.

No. 835,923. Specification of Letters Patent. Patented Nov. 13, 1906.

Application filed November 12, 1902. Serial No. 131,068.

*To all whom it may concern:*

Be it known that I, GEORGE W. VANDERSLICE, a citizen of the United States, and a resident of Coatesville, Pennsylvania, have invented certain Improvements in Valves for Regenerative Furnaces, of which the following is a specification.

My invention relates to certain improvements in reversing-valves for regenerative furnaces, the object of the invention being to so construct valves of this type that they will not be rapidly burned out.

A further object is to provide a construction which can be quickly dismantled or reversed and which has independent water-cooled rings for the upper and lower valve-seats, said seats being so formed that they can be reversed, if necessary.

In the accompanying drawings, Figure 1 is a sectional view of sufficient of the flues of a furnace to illustrate my invention. Fig. 2 is a view of a ring forming one of the seats for the valve. Fig. 3 is an enlarged view showing one of the joints, and Figs. 4, 5, and 6 are views of modifications.

A is the brickwork of the furnace, having a central stack-flue B, with branches B' B², each communicating with a valve-chamber D. Each chamber has an extension or hood D', one hood communicating with the furnace-flue C and the other extension communicating with the furnace-flue C'. Mounted above the valve-chambers is the gas-box E, which communicates with the gas-main and the upper ends of the valve-chambers.

The valve-chambers are constructed as follows: I I' are two rings forming the upper and lower ends of the valve-chamber D. Each ring also forms a seat for the valve H, which is hung from a stem H', operated in any suitable manner. The rings are reversible, so that when one seat is worn the ring can be turned to provide a new seat. Each ring has a flange, and on the casing of the valve-chamber is a flange or lug. Securing-bolts are passed through the flange on the rings and on the casing, as shown in Figs. 1 and 3, or long bolts may be used, as shown in Fig. 4, extending from one ring to the other. The casing may be lined with fire-brick K, if desired, as clearly shown in the drawings.

The two rings I I' each have an annular water-passage $i'$, which is connected to a suitable water-supply, so that the rings are kept comparatively cool, and thus the seats for the valve are prevented to a certain extent from burning out. It will be noticed in the drawings that the valve-seats of the rings are comparatively sharp and the contact-surface of the valve is segmental, so that when the valve is closed upon the seat it will tend to seat itself correctly, and the comparatively sharp edges of the seat will bite into any tar or other sediment that is formed on the valve, thus making a tight joint.

While I have shown the valve of the peculiar form illustrated, it may be in the form of a globe, as shown in Fig. 4, or of the form in which the bearing-surface is on an angle instead of on a curve, as illustrated in Fig. 5. I have made the valves and water-cooled seats as shown so that each can be easily machined on the contact-surfaces in order to make a gas-tight fit. The valve may be made hollow, as shown, or in any other manner to secure the necessary strength without water-cooling, as I prefer that the valve shall be sufficiently heated to prevent tar adhering to it and to melt any lumps of tar that may collect on the cooled surface of the seats, or the valve may be made with the sharp edge and the seat with the beveled or segmental surface, as shown in Fig. 6.

While my invention is especially adapted for reversing gas-valves for use in connection with regenerative furnaces, a single valve may be used for other purposes without departing from my invention.

I claim as my invention—

1. The combination in a gas-valve for regenerative furnaces, of a casing having upper and lower independent rings, each ring being hollow for the admission of water, a casing, and a fire-brick lining between the two rings, and means for securing the rings and the body of the casing together, with a valve, a valve-stem, the valve being open to the chests so that it will become heated and prevent the accumulation of tar on its bearing-surfaces, substantially as described.

2. The combination in a gas-valve for regenerative furnaces, of a casing having upper and lower rings, with a valve, a valve-stem, the valve being open to the chest so that it will become heated and prevent the accumulation of tar on its bearing-surfaces, substantially as described.

3. The combination in a gas-valve for regenerative furnaces, of a casing having upper and lower rings, each ring being hollow for the admission of water, with a valve and valve-stem, said valve being hollow and open at the under side so that it will become heated and prevent the accumulation of tar on its bearing-surfaces, substantially as described.

In testimony whereof I have signed my name to this specification in the presence of two subscribing witnesses.

GEORGE W. VANDERSLICE.

Witnesses:
J. L. CHRISTY,
M. J. WEIKEL.